(12) United States Patent
Miyazaki et al.

(10) Patent No.: US 11,349,378 B2
(45) Date of Patent: May 31, 2022

(54) COIL SEGMENT CUTTING METHOD AND COIL SEGMENT CUTTING APPARATUS

(71) Applicant: ODAWARA ENGINEERING CO., LTD., Kanagawa (JP)

(72) Inventors: Yuji Miyazaki, Kanagawa (JP); Noburo Miyawaki, Kanagawa (JP)

(73) Assignee: ODAWARA ENGINEERING CO., LTD., Kanagawa (JP)

( * ) Notice: Subject to any disclaimer, the term of this patent is extended or adjusted under 35 U.S.C. 154(b) by 0 days.

(21) Appl. No.: 16/892,864

(22) Filed: Jun. 4, 2020

(65) Prior Publication Data

US 2020/0303999 A1    Sep. 24, 2020

Related U.S. Application Data

(63) Continuation of application No. PCT/JP2018/039465, filed on Oct. 24, 2018.

(30) Foreign Application Priority Data

Dec. 7, 2017    (JP) .............................. JP2017-235080

(51) Int. Cl.
*H02K 15/04*    (2006.01)
(52) U.S. Cl.
CPC ................................ *H02K 15/0421* (2013.01)
(58) Field of Classification Search
CPC .................................................. H02K 15/0421
See application file for complete search history.

(56) References Cited

U.S. PATENT DOCUMENTS

| 8,443,509 B1 | 5/2013 | De Souza |
| 10,063,117 B2 | 8/2018 | Nakayama |
| 2003/0137207 A1 | 7/2003 | Tamura |

(Continued)

FOREIGN PATENT DOCUMENTS

| JP | S58209876 A | * 12/1983 |
| JP | S58209877 A | * 12/1983 |

(Continued)

OTHER PUBLICATIONS

International Search Report issued in Intl. Appln. No. PCT/JP2018/039465 dated Jan. 29, 2019. English translation provided.

(Continued)

*Primary Examiner* — Peter Dungba Vo
*Assistant Examiner* — Jose K Abraham
(74) *Attorney, Agent, or Firm* — Rossi, Kimms & McDowell LLP

(57) ABSTRACT

A cutting unit has a support member having insertion holes, and a movable member having through holes connected thereto. The respective left sides of upper surfaces of the square through holes are first movable blades, and the respective right sides thereof are second movable blades. Firstly, the movable member 14 is moved to the right by a predetermined amount to cut peeled-off portions of segment end portions only, and then the movable member is moved to the left by a predetermined amount to cut peeled-off portions of the segment end portions only. Distal ends of the coil segments can be cut into a uniform length to enable high quality welding, through this process.

9 Claims, 15 Drawing Sheets

(56) References Cited

U.S. PATENT DOCUMENTS

| | | |
|---|---|---|
| 2013/0106231 A1 | 5/2013 | Chamberlin |
| 2014/0225465 A1 | 8/2014 | Goto |
| 2015/0214820 A1 | 7/2015 | Geoffrion |
| 2016/0233652 A1 | 8/2016 | Goto |
| 2017/0264155 A1* | 9/2017 | Nakayama ............... H02K 3/12 |

FOREIGN PATENT DOCUMENTS

| | | |
|---|---|---|
| JP | 2017098161 A | 6/2017 |
| JP | 2017099220 A | 6/2017 |
| WO | 2013062950 A1 | 5/2013 |
| WO | 2017153925 A1 | 9/2017 |

OTHER PUBLICATIONS

Written Opinion issued in Intl. Appln. No. PCT/JP2018/039465 dated Jan. 29, 2019.

English translation of Written Opinion issued in Inti. Appln. No. PCT/JP2018/039465 dated Jan. 29, 2019, previously cited in IDS filed Jun. 4, 2020.

International Preliminary Report on Patentability issued in Intl. Appln. No. PCT/JP2018/039465 dated Jun. 18, 2020. English translation provided.

Extended European Search Report issued in European Appln. No. 18886672.7 dated Jan. 13, 2021.

Office Action issued in Chinese Appln. No. 201880078788.4 dated Nov. 25, 2021. English translation provided.

\* cited by examiner

[Fig.1]
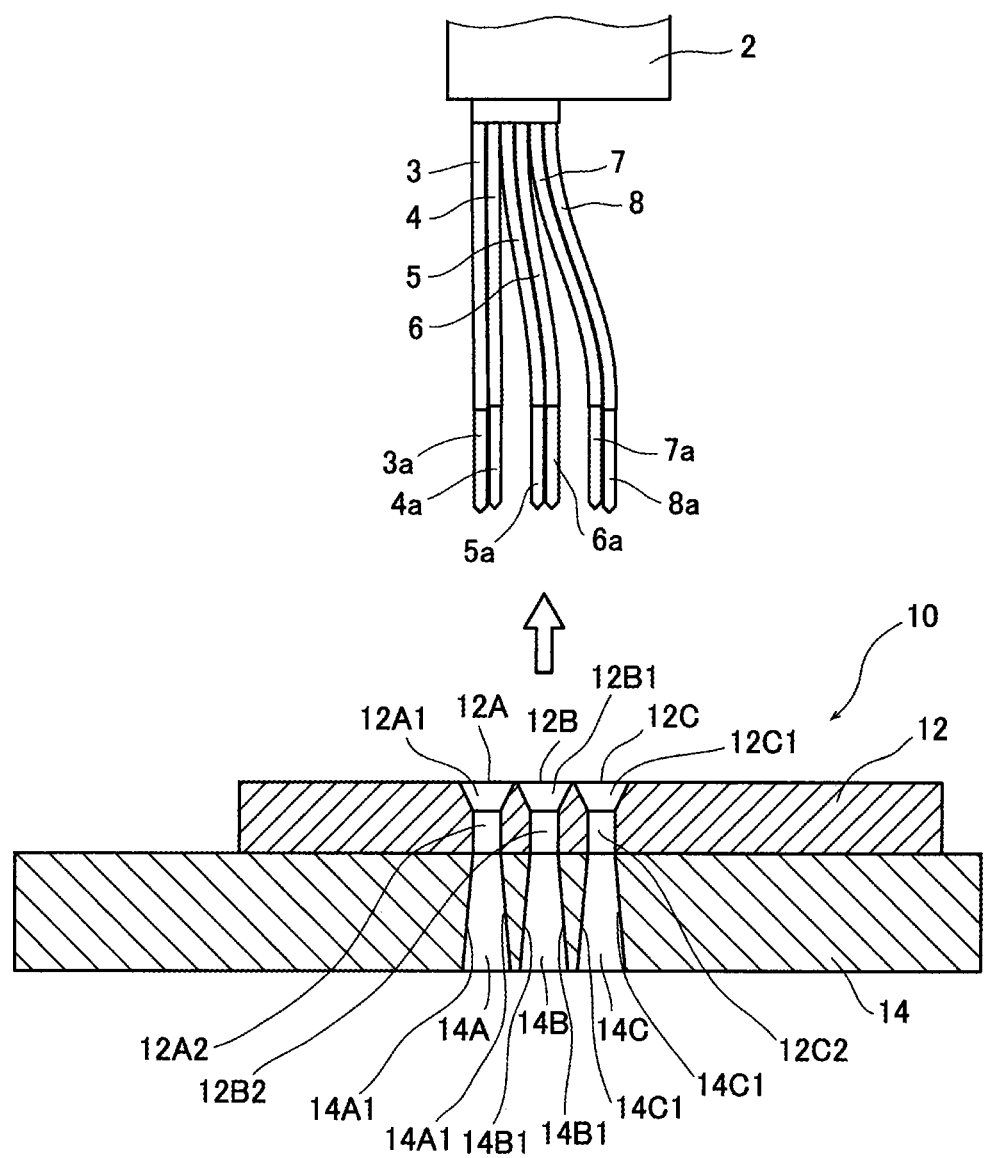

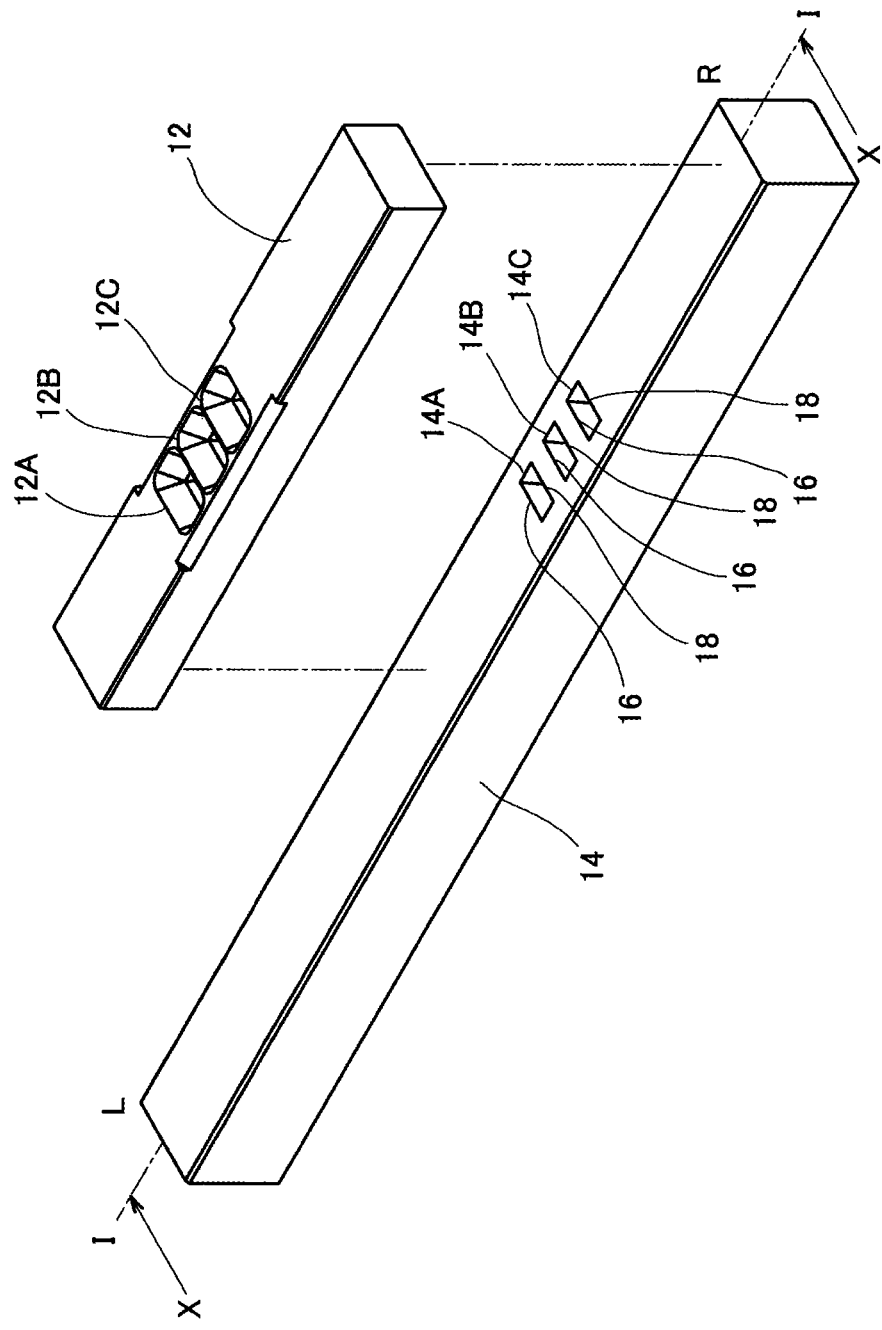

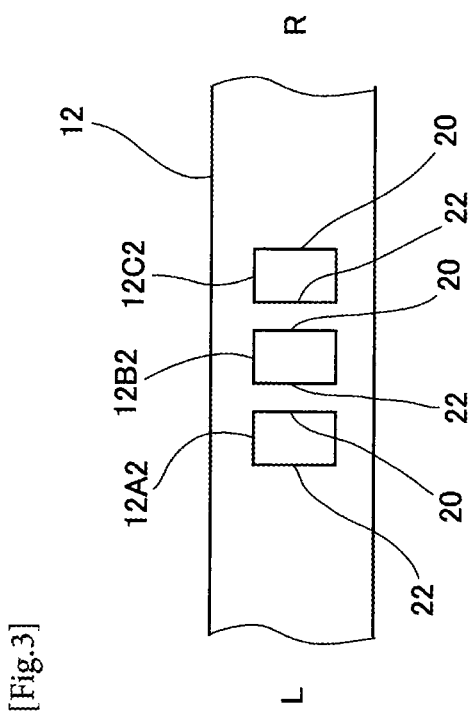

[Fig.4A]
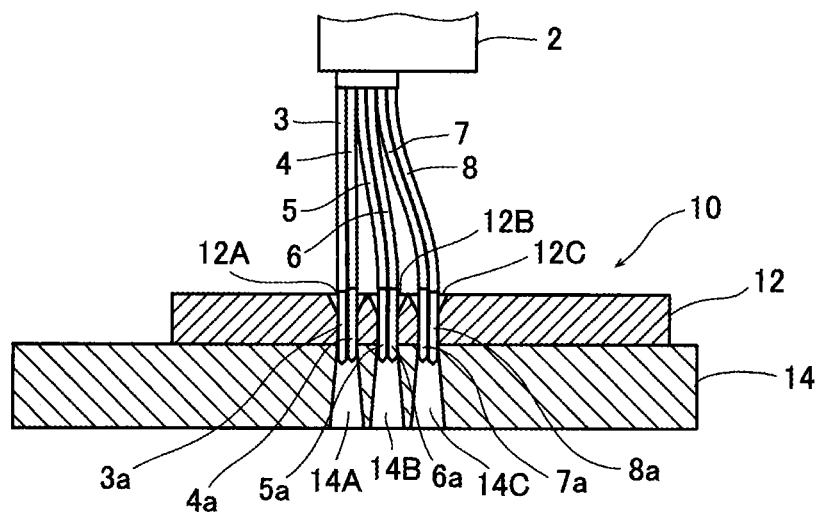
[Fig.4B]
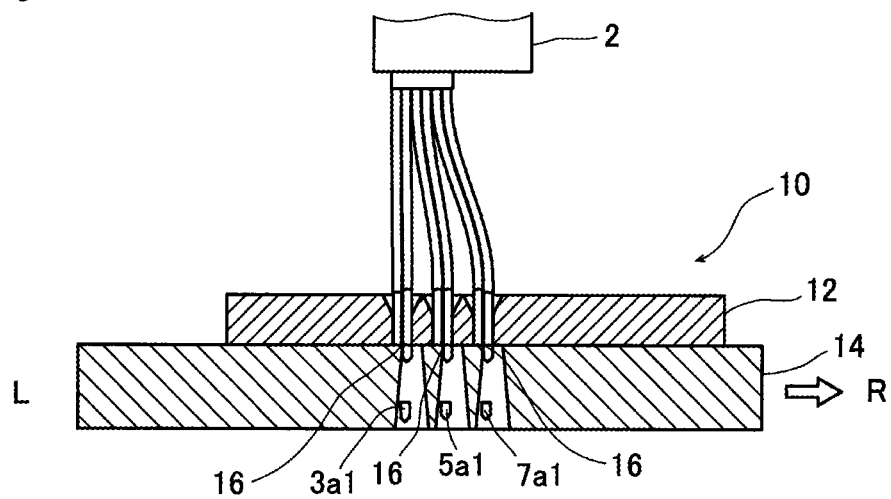
[Fig.4C]
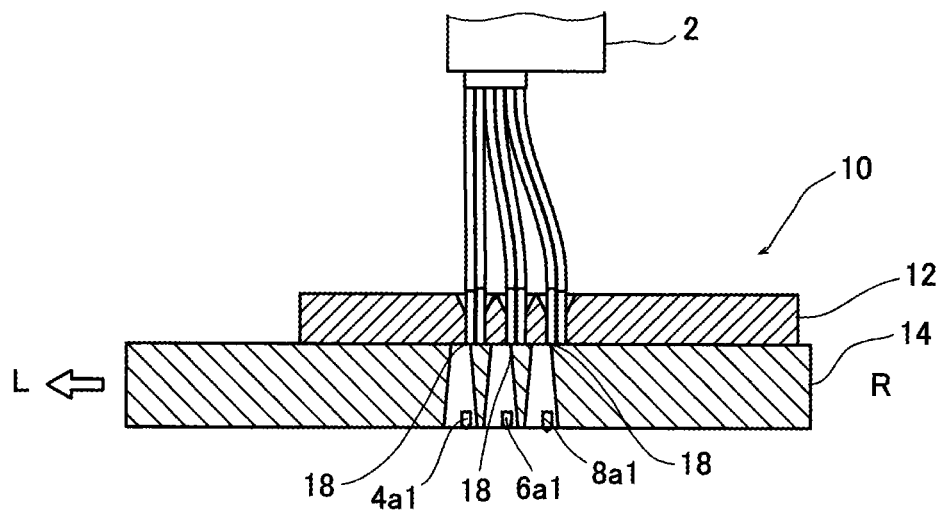

[Fig.5A]
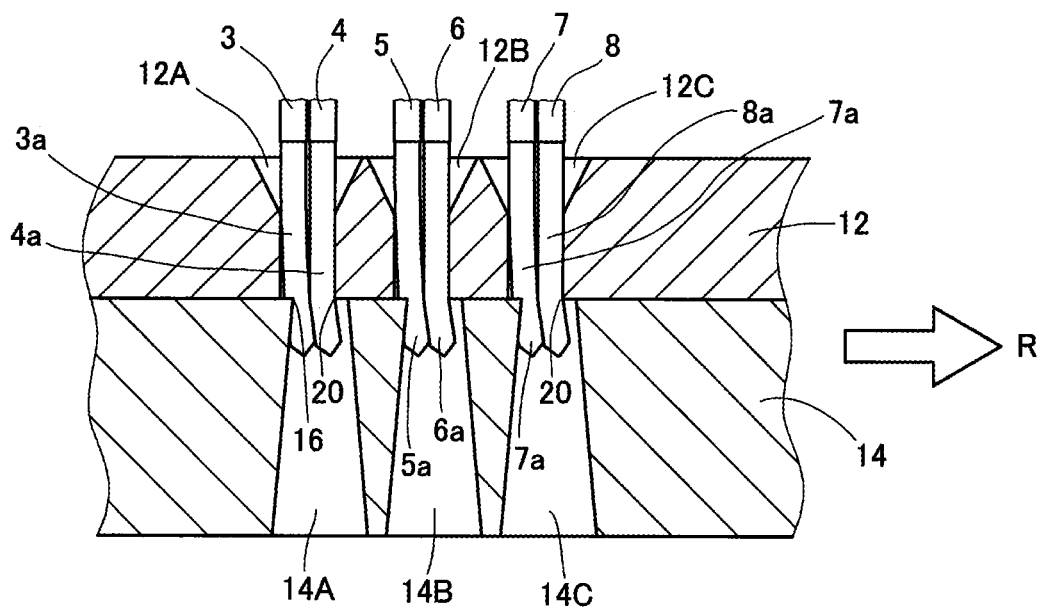
[Fig.5B]
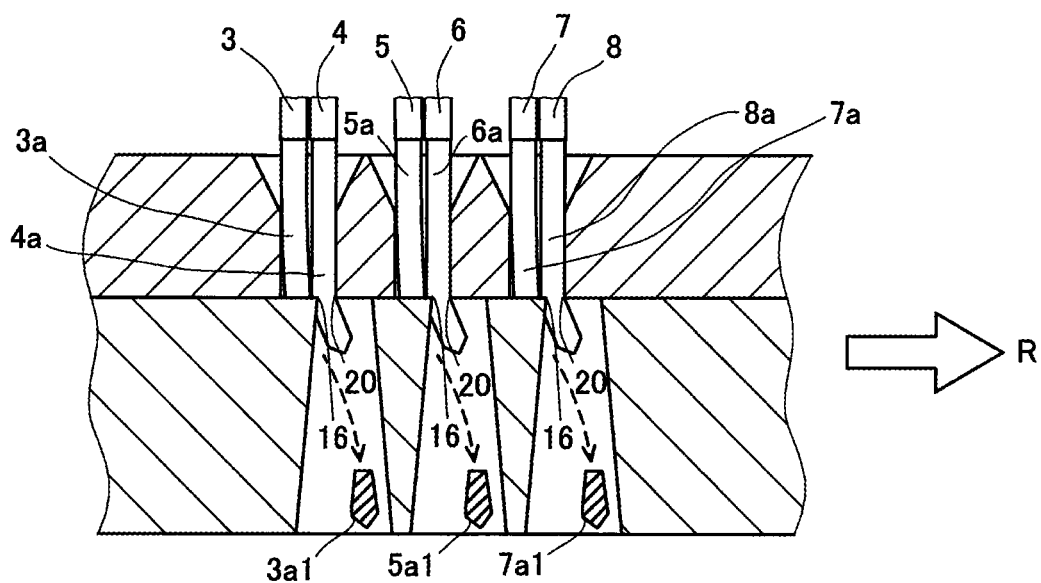

[Fig.6A]
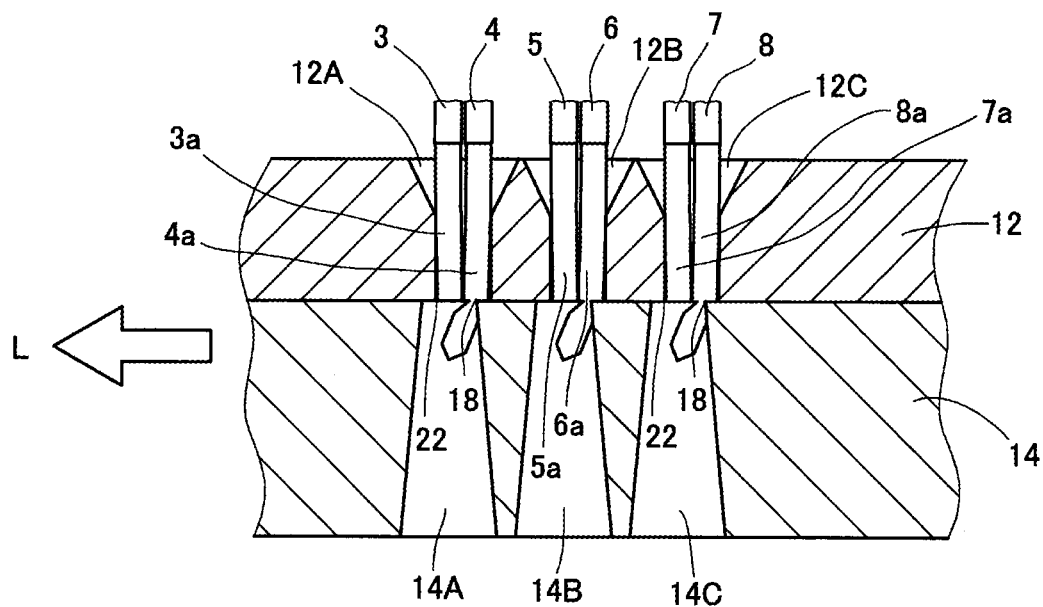
[Fig.6B]
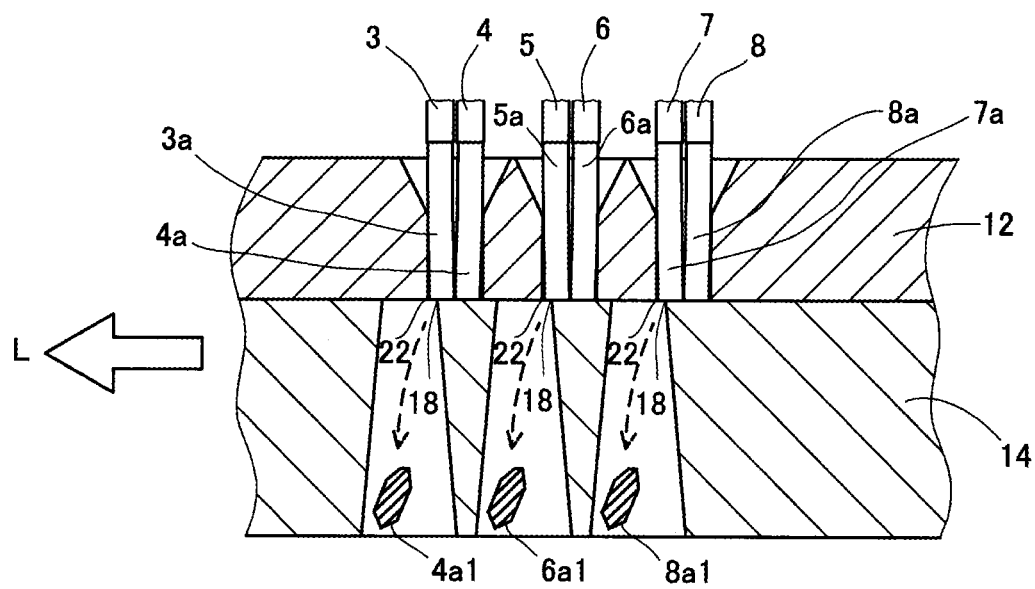

[Fig.7A]
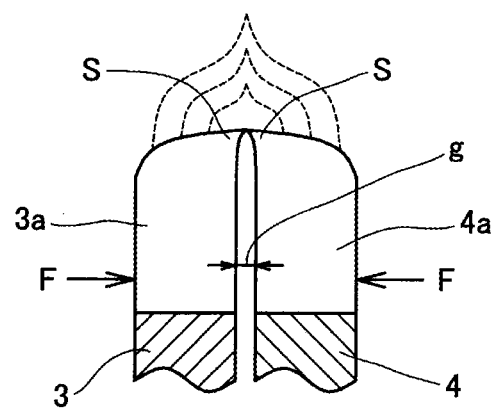
[Fig.7B]
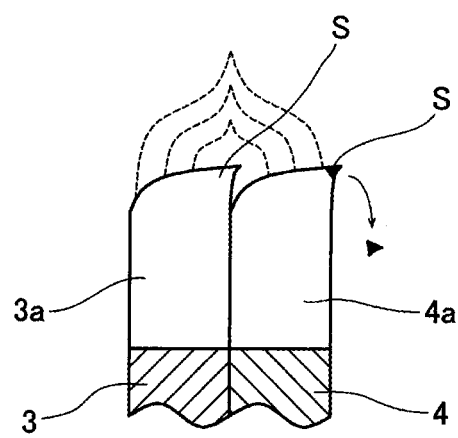

[Fig.8A]
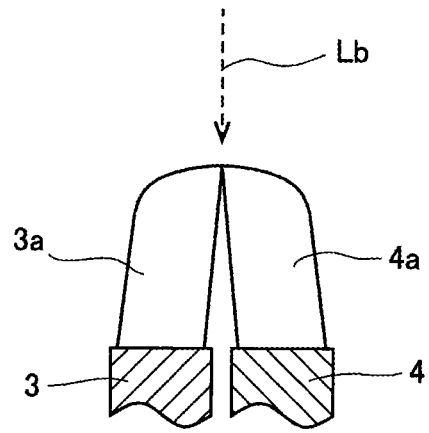
[Fig.8B]
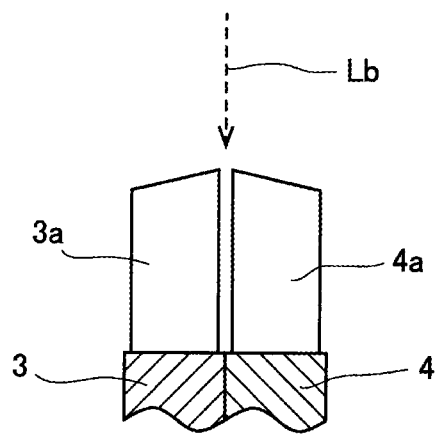

[Fig.9]
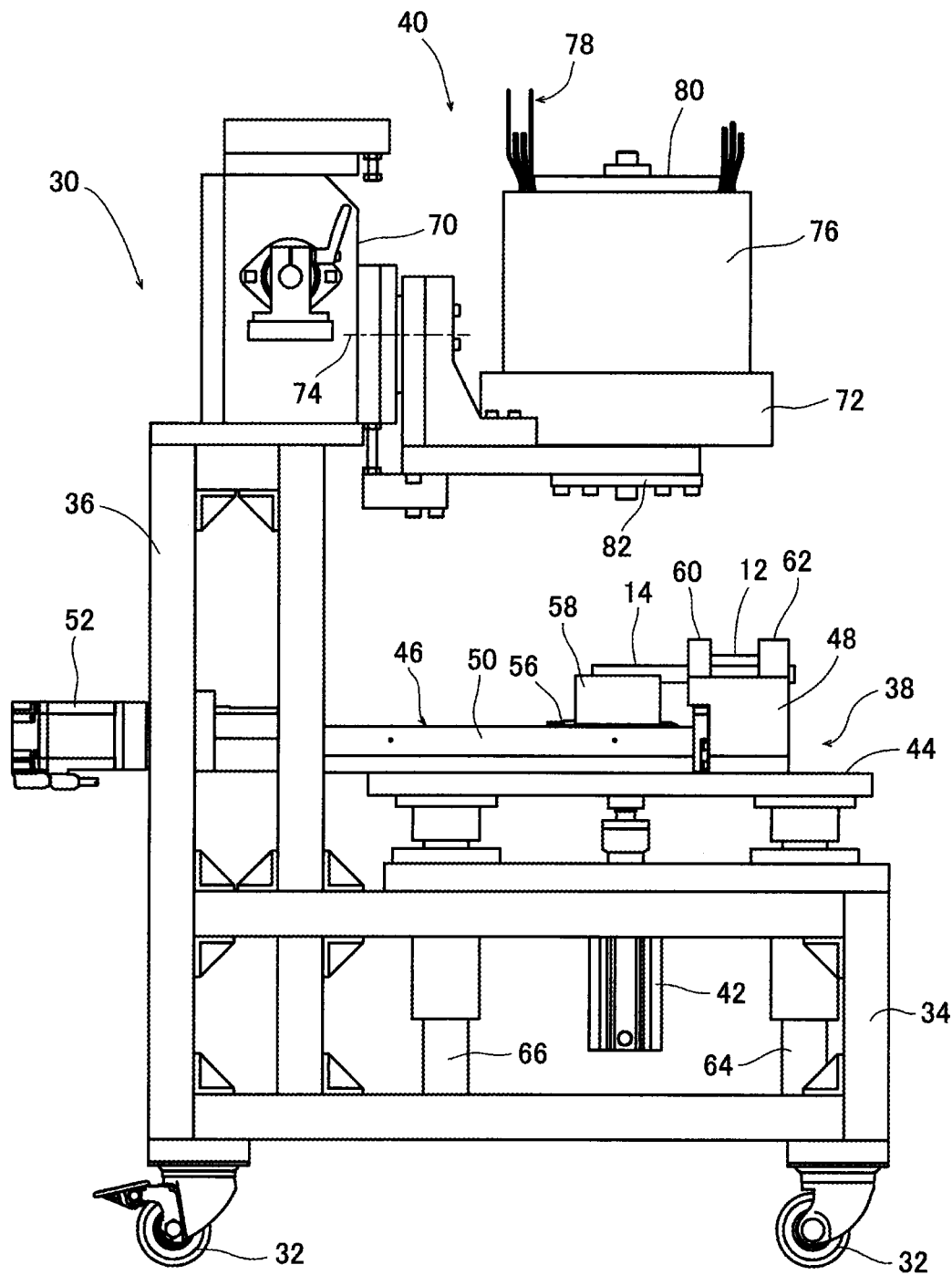

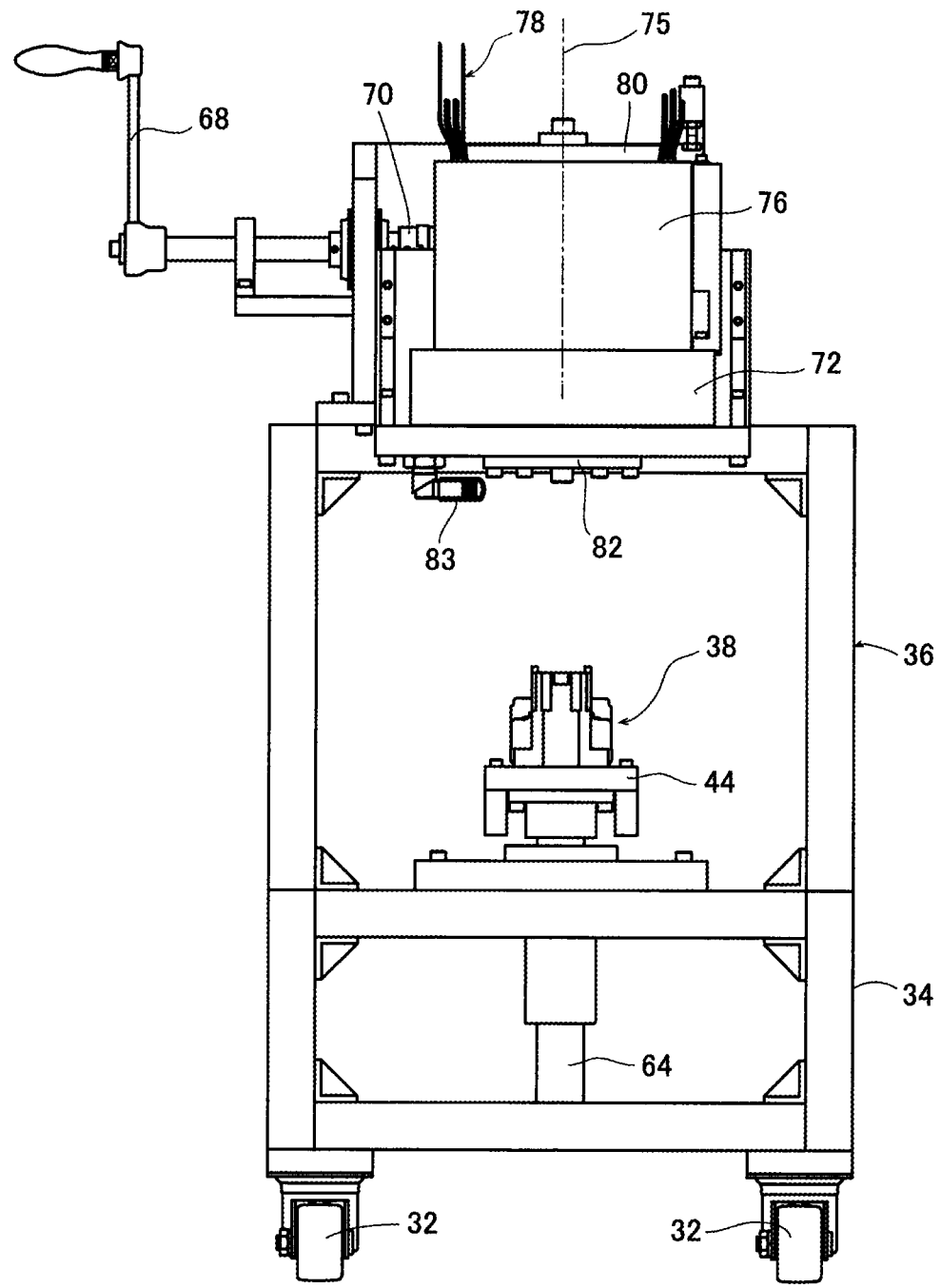
[Fig.10]

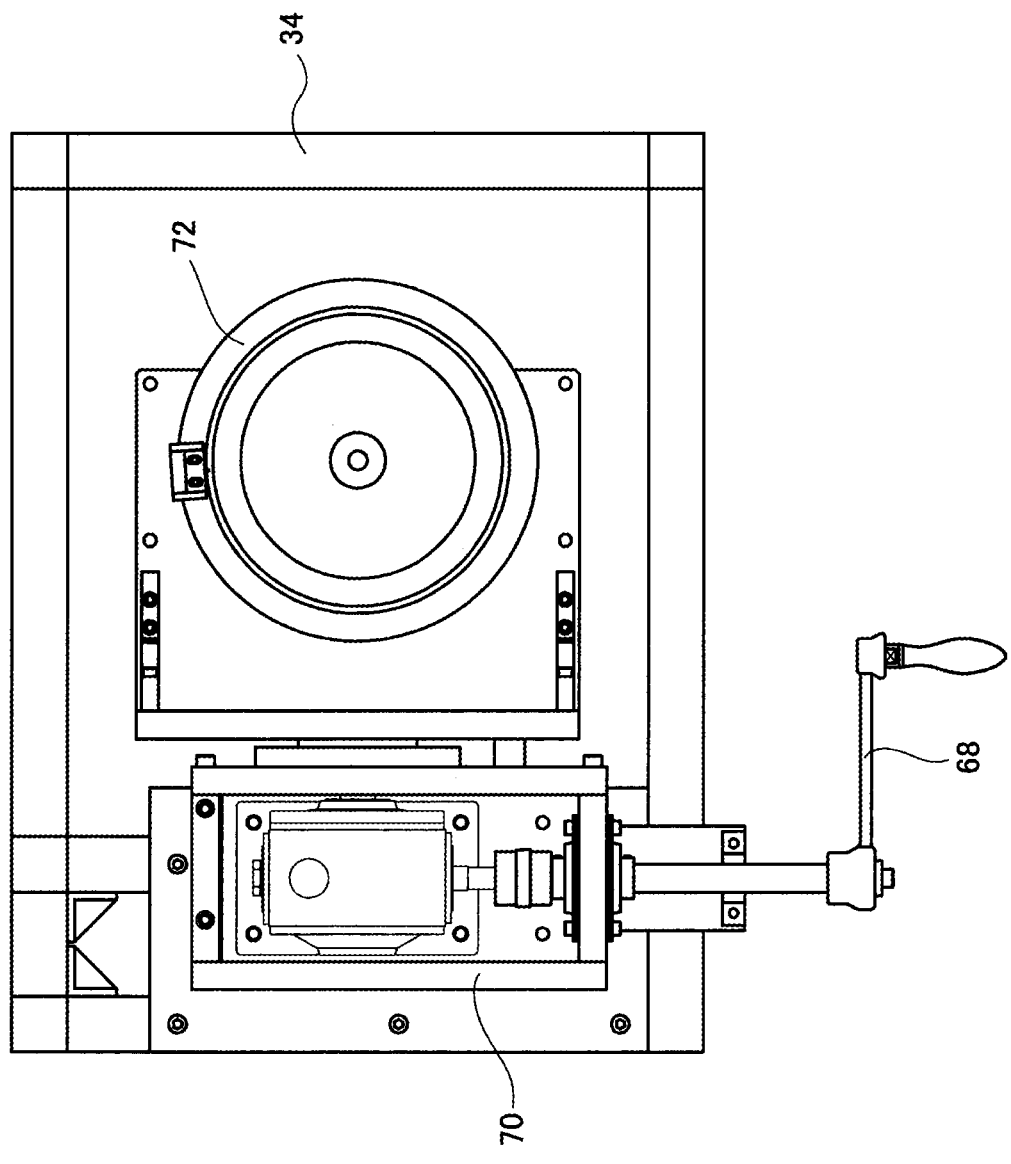
[Fig.11]

[Fig.12]
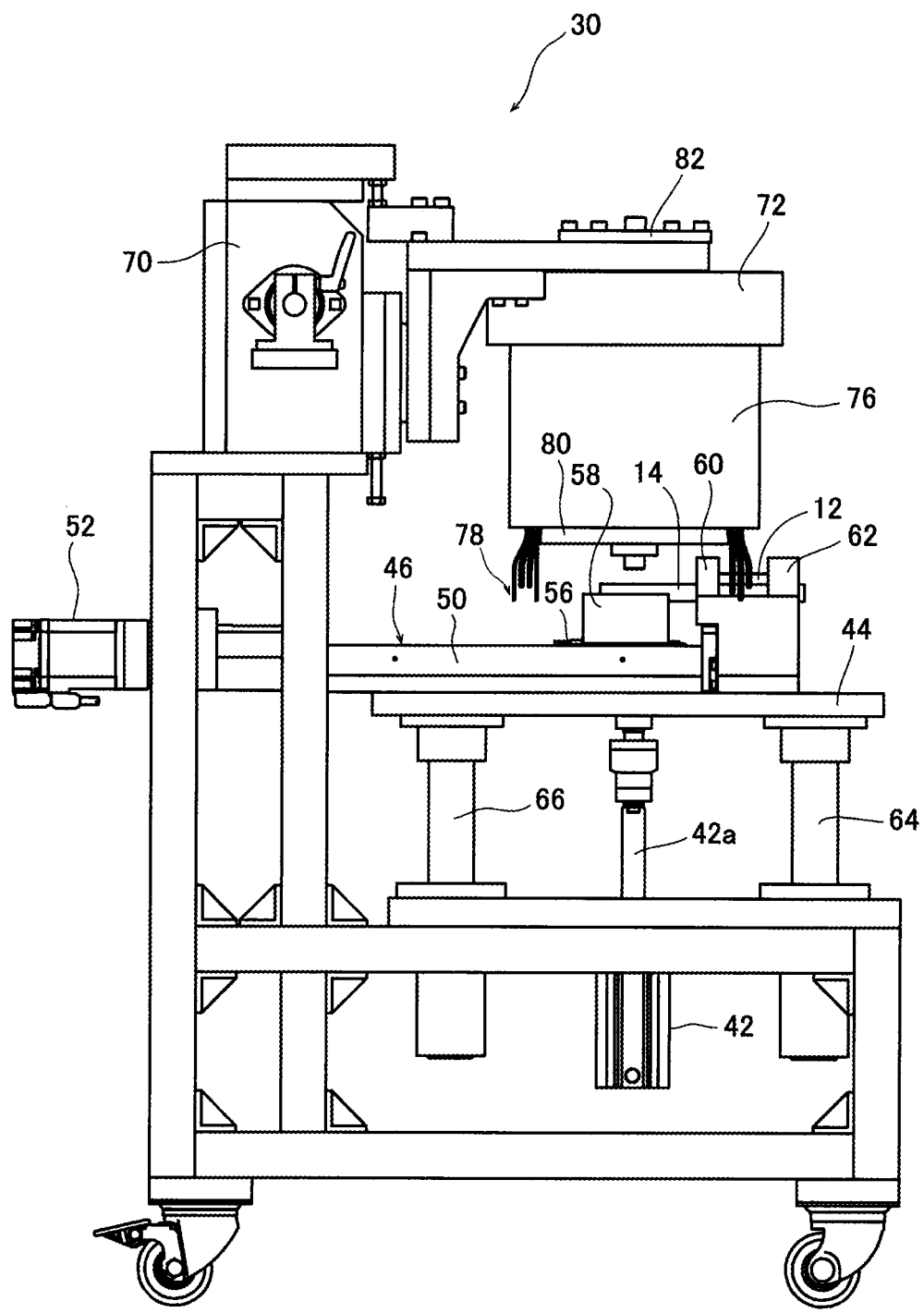

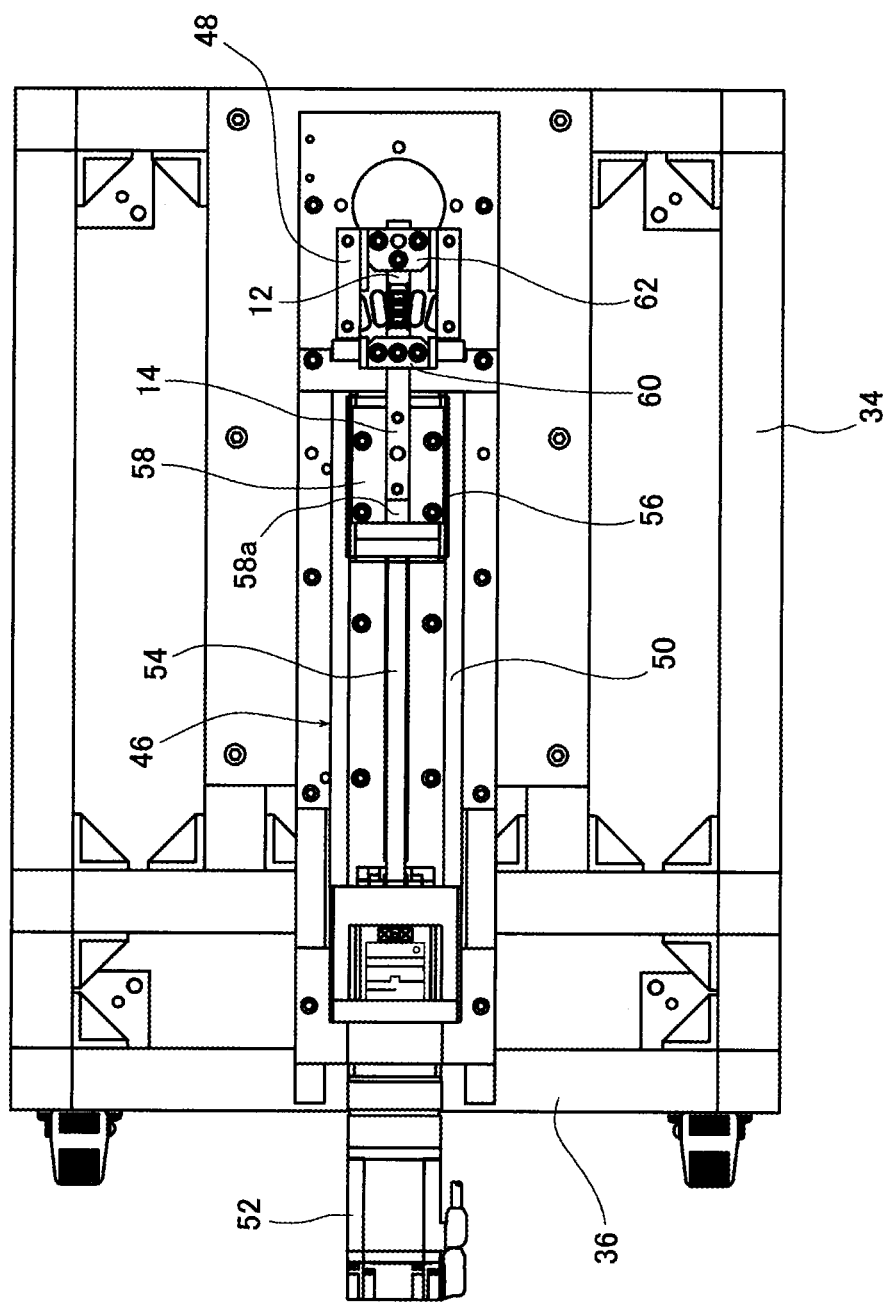
[Fig.13]

[Fig.14]
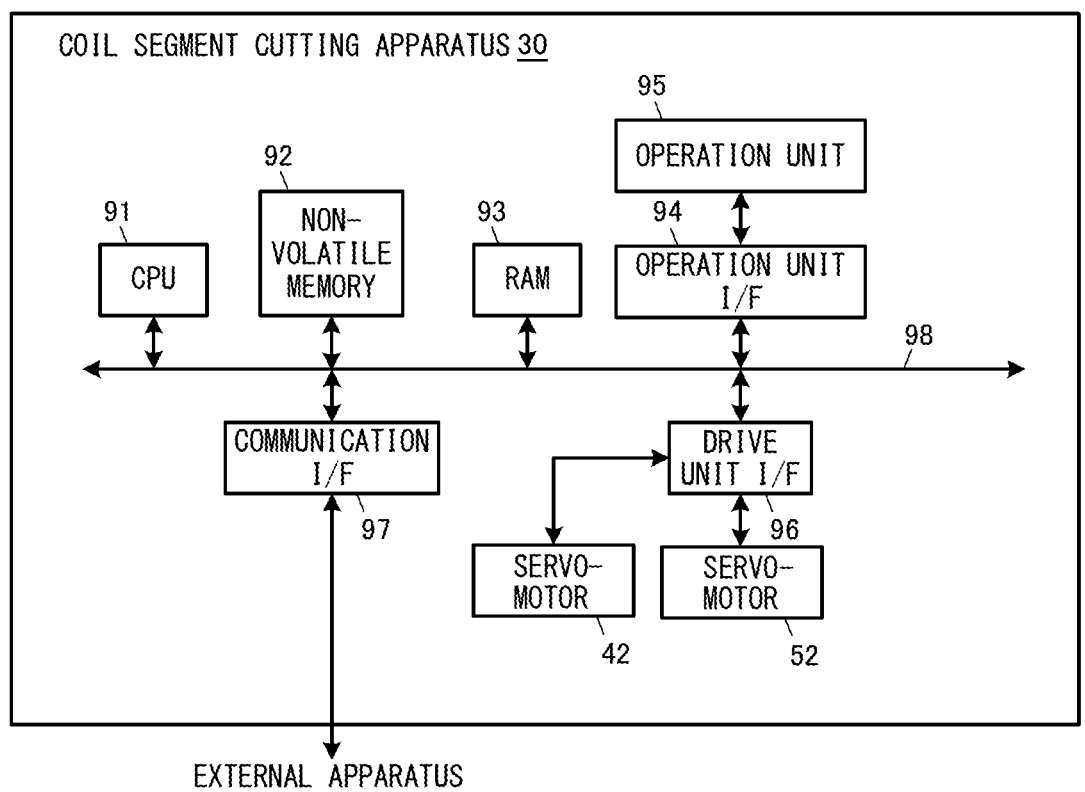

[Fig.15]
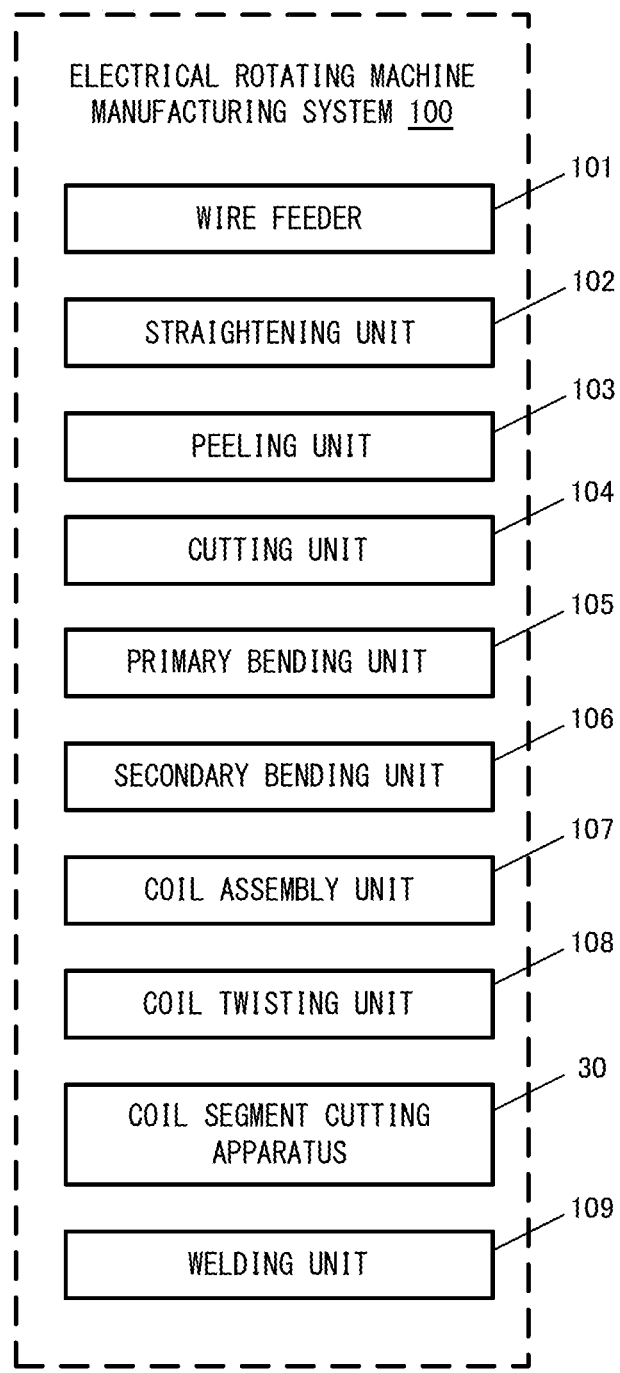

COIL SEGMENT CUTTING METHOD AND COIL SEGMENT CUTTING APPARATUS

TECHNICAL FIELD

The present invention relates to a coil segment cutting method and a coil segment cutting apparatus of cutting end portions (legs) of coil segments protruding from an end face of a core of a stator or rotor in an electrical rotating machine (rotary electric machine) such as a motor or a generator.

BACKGROUND ART

As a coil of a stator or rotor in an electrical rotating machine, so-called segment type coil is known, in which a plurality of coil segments (hereinafter, simply referred to also as segments), each formed by bending a straight wire rod of a predetermined length into a U-shape, are respectively inserted into a plurality of slots arranged along the circumferential direction of the stator or rotor, distal end portions in the insertion direction (segment end portions) of the segments protruding from the end face of the core are twisted, and the peeled-off portions at the ends thereof in which an insulative coating material is peeled off are electrically connected with each other by welding or the like. This type of coil segment is referred to also as a hairpin.

The segment end portions after the twisting, each having a portion parallel to the axial direction of the core, are joined with each other by TIG (Tungsten Inert Gas) welding or the like in a state where the peeled-off portions in the parallel portions of the segments in different lanes (layers) closely contact with each other.

In this case, if the lengths of the peeled-off portions in the axial direction of the core are not uniform, blowholes or the like tends to occur at the time of welding. This may cause deterioration of the mechanical characteristics or electrical characteristics over time in the rotary electric machine to be manufactured.

In such segment type coils, non-uniformity is accumulated in each process of cutting the straight wire to a predetermined length, bending them into the U-shape, inserting them into the slots, and twisting them. Thus, lengths of the peeled-off portions are likely to be uneven after the twisting.

Therefore, in order to suppress defects at the time of welding, it has been adopted to cut distal end portions of the peeled-off portions to align them after the twisting (see, for example, paragraph [0043] and FIG. 11 of PTL1).

The cutting is generally performed by moving a blade slidable on a support member in one direction, in a state where two segment end portions to be joined with each other are inserted into a hole of the fixed support member, to cut them with the shearing force. Although it has also been performed to cut manually using a cutting tool, the cutting accuracy is lower than mechanical processes in which a movable blade is moved by a drive mechanism. PTL1 discloses, as shown in FIG. 12 thereof, a method of cutting two segment end portions to be joined with each other by moving blades from both sides of the two segment end portions to nip and simultaneously cut them.

CITATION LIST

Patent Literature

[PTL1] Japanese Patent Application Laid-Open Publication No. 2017-99220

[PTL2] Japanese Patent Application Laid-Open Publication No. 2017-98161

SUMMARY OF INVENTION

Technical Problem

In a configuration of moving a movable blade in one direction to cut, as shown in FIG. 7B, downstream corner portion, in the moving direction of the movable blade, of the peeled-off portions 3a and 4a of the segment end portions 3 and 4 extend because of their metal flow, and thus burrs S are likely to occur.

A burr protrudes outward in one peeled-off portion 4a. If welding is made in this state, there is a concern that the burr portion becomes slag and falls off during melting by the welding, and enters the slots, resulting in deterioration of the electric or mechanical properties of the motor over time.

PTL1 discloses a configuration of simultaneously cutting the peeled-off portions by nipping them with cutting blades rotated from both sides thereof. However, since the force acts to push from the root side of the cutting blade to the cutting-edge side thereof in this method, the outer side of the peeled-off portion located on the cutting-edge side bulges and this could lead to burrs.

The present invention has been made in view of the above-mentioned circumstances, and it is an object of the present invention to cut end portions of coil segments into a uniform length so as to enable high-quality welding.

Solution to Problem

To achieve the above object, coil segment cutting method of the present invention is a coil segment cutting method of cutting a first and second segment end portions of coil segments to be joined with each other for aligning positions of apexes of the first and second segment end portions to be joined, the coil segments being inserted into slots of a core of a stator or a rotor to form a plurality of layers in a radial direction of the core, the first and second segment end portions being portions protruding from an end face of the core, comprising: cutting the first segment end portion with a first movable blade that moves such that the first movable blade pushes the first segment end portion onto the second segment end portion, in a state where the first and second segment end portions are stacked with each other and supported; and cutting the second segment end portion with a second movable blade that moves such that the second movable blade pushes the second segment end portion onto the first segment end portion.

In such coil segment cutting method, it is conceivable that when cutting the first segment end portion with the first movable blade, the second segment end portion is received and supported by a first fixed blade, and when cutting the second segment end portion with the second movable blade, the first segment end portion is received and supported by a second fixed blade.

Further, it is conceivable that the first movable blade and the second movable blade are provided integrally on one member, and that after cutting the first segment end portion by moving the one member in one direction, the second segment end portion is cut by moving the one member in a direction opposite to the one direction.

Further, it is conceivable that the first and second segment end portions are cut in a state where the core is supported such that the first and second segment end portions face downward.

Coil segment cutting apparatus of the present invention is a coil segment cutting apparatus configured to cut a first and second segment end portions of coil segments to be joined with each other for aligning positions of apexes of the first and second segment end portions to be joined, the coil segments being inserted into slots of a core of a stator or a rotor to form a plurality of layers in a radial direction of the core, the first and second segment end portions being portions protruding from an end face of the core, comprising: a support member configured to support the first and second segment end portions in a state where the first and second segment end portions are stacked with each other; a first movable blade configured to move to push the first segment end portion onto the second segment end portion; a second movable blade configured to move to push the second segment end portion onto the first segment end portion; and a driving mechanism configured to drive the first movable blade and the second movable blade to cut the first segment end portion with the first movable blade and cut the second segment end portion with the second movable blade.

Such a coil segment cutting apparatus may further comprise: a first fixed blade configured to receive and support the second segment end portion when cutting the first segment end portion with the first movable blade; and a second fixed blade configured to receive and support the first segment end portion when cutting the second segment end portion with the second movable blade.

Further, it is conceivable that the first movable blade and the second movable blade are provided integrally with one movable member slidable with respect to the support member, and wherein the first fixed blade and the second fixed blade are provided integrally with the support member.

Further, it is conceivable that the support member comprises a plurality of insertion holes for inserting the first and second segment end portions therein, the insertion holes being aligned along a direction of movement of the movable member, that each of the insertion holes comprises the first fixed blade and the second fixed blade, that the movable member comprises a plurality of through holes configured to respectively connect with the plurality of insertion holes when the movable member is at a predetermined position, and that each of the through holes comprises the first movable blade and the second movable blade.

Further, the coil segment cutting apparatus may further comprise a work supporting member configured to house and support the core and capable of changing attitude of the core such that the first and second segment end portions face downward.

Effect of the Invention

According to the present invention, end portions of coil segments can be cut into a uniform length to enable high quality welding.

BRIEF DESCRIPTION OF DRAWINGS

FIG. 1 is a diagram schematically showing a state of a coil segment cutting apparatus according to an embodiment of the present invention, before inserting segment end portions into a cutting unit thereof.

FIG. 2 is an exploded perspective view of the cutting unit shown in FIG. 1.

FIG. 3 is a bottom view of a main part of a support member of the cutting unit shown in FIG. 1.

FIG. 4A is a sectional view showing a cutting operation by the coil segment cutting apparatus shown in FIG. 1, showing a state in which peeled-off portions of the segment end portions are inserted into the cutting unit.

FIG. 4B is a diagram showing a state after FIG. 4A, in which the peeled-off portions of respective ones of the segment end portions are cut off.

FIG. 4C is a diagram showing a state after FIG. 4B, in which the peeled-off portions of the respective others of the segment end portions are cut off.

FIG. 5A is an enlarged sectional view showing the cutting operation in FIG. 4B in detail, showing a state in the middle of the cuffing.

FIG. 5B is a diagram showing a state after FIG. 5A, in which the cutting has been performed through an overrun.

FIG. 6A is an enlarged sectional view showing the cutting operation in FIG. 4C in detail, showing a state in the middle of the cutting.

FIG. 6B is a diagram showing a state after FIG. 6A, in which the cutting has been performed through an overrun.

FIG. 7A is a view schematically showing a state of the segment end portions cut by the coil segment cutting apparatus according to the embodiment of the present invention, focusing on an effect obtained when joining them by arc welding.

FIG. 7B is a view corresponding to FIG. 7A, showing an example of a state of segment end portions cut by a conventional method.

FIG. 8A is a view schematically showing a state of the segment end portions cut by the coil segment cutting apparatus according to the embodiment of the present invention, focusing on an effect obtained when joining them by laser.

FIG. 8B is a view corresponding to FIG. 8A, showing an example of a state of segment end portions cut by a conventional method.

FIG. 9 is a schematic front view showing a coil segment cutting apparatus equipped with the cutting unit shown in FIG. 1.

FIG. 10 is a schematic side view of the coil segment cutting apparatus shown in FIG. 9.

FIG. 11 is a schematic plan view of the coil segment cutting apparatus shown in FIG. 9.

FIG. 12 is a schematic front view of the coil segment cutting apparatus shown in FIG. 9 with the workpiece facing downward.

FIG. 13 is a schematic plan view corresponding to FIG. 11, showing the coil segment cutting apparatus shown in FIG. 9 with the work holding mechanism thereof removed so that the drive mechanism thereof can be seen.

FIG. 14 is a diagram showing a configuration of a control unit of the coil segment cutting apparatus shown in FIG. 9.

FIG. 15 is a block diagram showing an outline of an electrical rotating machine manufacturing system incorporating a coil segment cutting apparatus according to the present embodiment.

DESCRIPTION OF EMBODIMENTS

Hereinafter an embodiment of the present invention will be described with reference to the drawings. First, a coil segment cutting method using a coil segment cutting apparatus according to the present embodiment will be described.

This cutting method is, as shown in FIG. 1, a method of cutting distal ends of respective segment end portions 3, 4, 5, 6, 7, and 8 which are respective end portions of a plurality of coil segments, protruding from an end face of a core 2, wherein the coil segments are respectively inserted into slots of the core 2 of a stator or rotor to form a plurality of layers (six layers here) in the radial direction of the core 2. The cut is performed for aligning positions (heights along the axial direction of the core) of apexes of peeled-off portions 3a, 4a, 5a, 6a, 7a, and 8a at the distal ends of the segmented end portions 3 to 8. Incidentally, only a portion of the core 2 in a cylindrical shape is shown in FIG. 1.

The peeled-off portion is a portion from which an insulating layer such as enamel is peeled off FIG. 1 shows a state after twisting the segment end portions to join them by TIG welding or the like.

The segment end portions 3 and 4, the segment end portions 5 and 6, and the segment end portions 7 and 8 are pairs of segment end portions of adjacent layers, and segment end potions in each pair are joined with each other in a post-cutting process.

In this example, after the twisting, the peeled-off portion 3a of the segment end portion 3 and the peeled-off portion 8a of the segment end portion 8 protrudes downward in the figure longer than the peeled-off portions of the segment end portions to be joined with them, respectively, and accordingly the positions of the apexes thereof are not aligned.

If welding is performed in a state where the positions of the apexes of the peeled-off portions are not aligned, blowholes or the like tends to occur as described above. This may cause deterioration of the mechanical characteristics or electrical characteristics over time in the electrical rotating machine to be manufactured.

In order to solve such a concern, distal ends of the segment end portions are cut to align the position of the apex of the peeled-off portion of the segment end portion with that of the segment end portion to be joined with it, after the twisting. This cutting is performed by a cutting unit 10. The cutting unit 10 consists of, as shown in FIG. 1 and FIG. 2, an elongated block-shaped support member 12 fixed to the immovable portion of the coil segment cutting apparatus described later, and another elongated block-shaped movable member 14 slidably provided on the lower surface of the support member 12.

The movable member 14 shown in FIG. 1 is shown by a vertical sectional view taken along the line I-I in FIG. 2 from the direction of the arrow X.

As shown in FIG. 2, the support member 12 has, in its longitudinal central portion: insertion holes 12A, 12B, and 12C for inserting two adjacent segment end portions each; not shown screw holes for fixing the support member 12 to the immovable portion; and the like.

The movable member 14 has: square through holes 14A, 14B, and 14C respectively opposed and connected to the insertion holes 12A, 12B, and 12C when the movable member 14 is at a position shown in FIG. 1; screw holes for coupling the movable member 14 to a drive mechanism described later; and the like. That is, the cutting unit 10 has a configuration for collectively cutting respective peeled-off portions of a plurality of segment end portions present in a row in the radial direction of the core 2.

The insertion holes 12A, 12B, and 12C of the support member 12 respectively consist of: tapered portions 12A1, 12B1, and 12C1 having a large opening diameter on the upper surface side in FIG. 1; and straight portions 12A2, 12B2, and 12C2 which are square in cross-section, to respectively guide stacked peeled-off portions of two segment end portions into the through holes 14A, 14B, and 14C, so that the peeled-off portions of the segment end portions can be easily inserted into the insertion holes 12A, 12B, and 12C in the stacked state.

Each distal end of the peeled-off portions of the segment end portions 3, 4, 5, 6, 7, and 8 is in a mountain shape so that the distal end can be easily inserted into the insertion holes 12A, 12B, or 12C. The shape of the distal end of the peeled-off portion is formed due to the shape of cutting blade of the cutting unit 104 (see FIG. 15) at the time of wire supply in the electrical rotating machine manufacturing system.

The through-holes 14A, 14B, and 14C of the movable member 14 respectively have tapered surfaces 14A1, 14B1, and 14C1 extending in the horizontal direction toward the lower side in the figure.

Because of the taper shapes of respective through holes 14A, 14B, and 14C of the movable member 14 extending toward the lower side, as shown in FIG. 2, respective one sides of the top face of the through holes 14A, 14B, and 14C in the longitudinal direction of the movable member 14 (respective one sides on the L side) function as sharp first movable blades 16, and respective other sides (respective one sides on the R side) function as sharp second movable blades 18. Therefore, the first movable blades 16 and the second movable blades 18 are provided integrally with the movable member 14 which is one member slidable with respect to the support member 12.

On the other hand, on the lower face of the respective straight portions 12A2, 12B2, and 12C2 of the support member 12, as shown in FIG. 3, respective one sides in the longitudinal direction of the support member 12 (respective one sides on the R side) function as right-angled first fixed blades 20, and respective other sides (respective one sides on the L side) function as right-angled second fixed blades 22. Therefore, the first fixed blades 20 and the second fixed blades 22 are provided integrally with the support member 12.

The core 2 may be moved to insert the peeled-off portions into the insertion holes 12A, 12B, and 12C of the support member 12, but the cutting unit 10 is raised in the present embodiment as indicated by a white arrow in FIG. 1. It is preferable, from the viewpoint of energy efficiency, to raise and lower the relatively lightweight cutting unit 10 side than to raise and lower the core 2 side which is a heavy object.

Referring now to FIG. 4A to FIG. 6B, the cutting operation of the segmented end portions by the cutting unit 10 will be described.

FIG. 4A shows a state in which the cutting unit 10 is raised to insert the peeled-off portions of the respective segment end portions into the insertion holes 12A, 12B, and 12C of the support member 12, and the peeled-off portions of the respective segment end portions enter into the through holes 14A, 14B, and 14C of the movable member 14. It is preferable that the penetration depth of the peeled-off portions into the through holes 14A, 14B, and 14C is set to a minimal depth for eliminating unevenness in length by the cutting, in view of avoiding waste.

After completing the insertion of the peeled-off portions of the respective segment end portions to the cutting unit 10, as shown in FIG. 4B, the movable member 14 is moved a predetermined amount to the right side (direction of the arrow R) in the figure by the drive mechanism described later. As a result, the respective distal ends of the peeled-off portions 3a, 5a, and 7a of the segment end portions 3, 5, and 7 are cut by the first movable blades 16.

The cut-off pieces 3a1, 5a1, and 7a1 pass through the through holes 14A, 14B, and 14C, respectively, and fall to the outside of the movable member 14, and are stored in a not-shown storing recess portion. Amount of the movement of each of the first movable blades 16 on the movable member 14 is controlled by the control unit (see FIG. 14) configured to control the drive mechanism described later such that the movable blades 16 cut, among the three pairs of the segment end portions, the peeled-off portions 3a, 5a, and 7a of the respective one segment end portions 3, 5, and 7 (hereinafter, respectively referred to as "first peeled-off portions" and "first segment end portions") only.

In this case, respective first movable blades 16 move to press the first segment end portions 3, 5, and 7 onto the corresponding other segment end portions 4, 6, and 8 (hereinafter, referred to as "second segment end portions"), respectively. Therefore, as shown in an enlarged manner in FIG. 5A, the respective first peeled-off portions 3a, 5a, and 7a made of a soft material such as copper bend (deflect) to the right side in the figure because of the pressing force by the first movable blades 16, and the cutting of the respective first peeled-off portions 3a, 5a, and 7a proceeds while the bending occurs. The bending occurs because clearance for allowing insertion of the peeled-off portions exists in the insertion holes 12A, 12B, and 12C, respectively, and thus there is room for the respective peeled-off portions to move in the insertion holes 12A, 12B, and 12C.

Accordingly, after the cutting, the respective first peeled-off portions 3a, 5a, and 7a keep curved configurations toward the peeled-off portions 4a, 6a, and 8a (hereinafter, referred to as "second peeled-off portions") of the corresponding second segmented end portions 4, 6, and 8. The burrs caused by the pressing and cutting by the first movable blades 16 are formed to extend toward the respective second peeled-off portions 4a, 6a, and 8a.

As shown in FIG. 5B, the first movable blades 16 are moved so that their cutting edges slightly bite into the respective second peeled-off portions 4a, 6a, and 8a. That is, the amount of the movement of the first movable blades 16 is an amount slightly exceeding the widths of the respective first peeled-off portions 3a, 5a, and 7a in the lateral direction (direction of the arrows L and R).

This excessive movement (overrun) of the first movable blades 16 ensures the bending of the respective first peeled-off portions 3a, 5a, and 7a toward the respective second peeled-off portions 4a, 6a, and 8a at the time of the cutting, and also ensures that burrs occur only on the second peeled-off portions 4a, 6a, and 8a side. For the sake of clarity, in FIG. 5B, the cut pieces 3a1, 5a1, and 7a1 are hatched (same in FIG. 6B).

At the time of cutting the first peeled-off portions 3a, 5a, and 7a, the respective second peeled-off portions 4a, 6a and 8a which are not cut are supported by the first fixed blades 20 facing the first movable blades 16.

The drag force generated by the first fixed blades 20 acts in the opposite direction to the traveling direction of the first movable blade 16 through the second peeled-off portions 4a, 6a, and 8a, and acts to push the respective back sides (i.e. sides opposite to the sides from which the first movable blades 16 cut in) of the first peeled-off portions 3a, 5a, and 7a. As a result, only the first peeled-off portions 3a, 5a, and 7a can be cut even if bending occurs because the peeled-off portions are formed of soft materials.

The movable member 14 stopping at the state after cutting the first peeled-off portions 3a, 5a, and 7a is then moved a predetermined amount to the left side (direction of the arrow L) in the figure, which is the reverse direction, as shown in FIG. 4C.

As a result, respective distal ends of the second peeled-off portions 4a, 6a, and 8a are cut by the second movable blades 18. The cut-off pieces 4a1, 6a1, and 8a1 pass through the through holes 14A, 14B, and 14C, respectively, and fall to the outside of the movable member 14, and are stored in the non-shown storing recess portion.

Amount of the movement of each of the second movable blades 18 on the movable member 14 is controlled by the control unit configured to control the drive mechanism described later such that the second movable blades 18 cut, among the three pairs of the segment end portions, the second peeled-off portions 4a, 6a, and 8a of the respective second segment end portions 4, 6, and 8 only.

In this case, the respective second movable blades 18 move to press the second segment end portions 4, 6, and 8 onto the corresponding first segment end portions 3, 5, and 7, respectively. Therefore, as shown in an enlarged manner in FIG. 6A, the second peeled-off portions 4a, 6a, and 8a are cut while being undone their bends (deflection) to the right side and then being bent to the opposite left side, in the figure.

As shown in FIG. 6B, the amount of the movement of the second movable blades 18 is an amount slightly exceeding the widths of the respective second peeled-off portions 4a, 6a, and 8a in the lateral direction (direction of the arrows L and R).

This excessive movement (overrun) of the second movable blades 18 ensures the bending of the respective second peeled-off portions 4a, 6a, and 8a toward the respective first peeled-off portions 3a, 5a, and 7a at the time of the cutting, and also ensures that burrs occur only on the first peeled-off portions 3a, 5a, 7a side. At the time of cutting the second peeled-off portions 4a, 6a, and 8a, the respective first peeled-off portions 3a, 5a and 7a whose distal ends have been already cut are supported by the second fixed blades 22 facing the second movable blades 18.

The drag force generated by the second fixed blades 22 acts in the opposite direction to the traveling direction of the second movable blades 18 through the first peeled-off portions 3a, 5a and 7a, and acts to push the respective back sides (i.e. sides opposite to the sides from which the second movable blades 18 cut in) of the second peeled-off portions 4a, 6a, and 8a. As a result, only the second peeled-off portions 4a, 6a, and 8a can be cut even if bending occurs because the peeled-off portions are formed of soft materials.

Although the movable member 14 is firstly moved from left to right and then moved in the opposite direction in the present embodiment, the order may be reversed. Further, in the present embodiment, since the distal ends of the peeled-off portions are cut in a state where the segment end portions face downward in the vertical direction, the cut-off pieces drop to the outside of the core 2. Therefore, it is possible to prevent the cut-off pieces from falling inside the core 2 and causing deterioration of mechanical characteristics or electrical characteristics thereof over time.

As described above, the peeled-off portions of two segment end portions of each pair are cut alternately one by one through pressing one peeled-off portion to be cut onto the other, and accordingly the burr S arises in each peeled-off portion at the inner portion of the pair, as shown in FIG. 7A.

If the peeled-off portions of each pair are joined with each other through welding by TIG welding or the like in this state, the melted burrs S become cool and solidify as a part of the joint portion without falling off into the core 2. Therefore, it is possible to prevent the burrs S from causing deterioration of mechanical characteristics or electrical characteristics of the electrical rotating machine utilizing the coil to be formed. Further, since the segment end portions of each pair are generally welded in a state of being pressed in the direction of the arrows F from both sides by a clamper, when the burr portions melt during the welding, the bend of each peeled-off portion caused by the cutting and the gap g caused by the burrs S disappear. In FIG. 7A, hatching indicates a coating layer made of insulating resin. The dashed line indicates an arc for welding.

FIG. 7B shows, as a comparative example, a state where the movable blades are moved in one direction and the distal ends of the peeled-off portions of the segment end portions 3 and 4 are cut at the same time, in the same manner as in FIG. 7A. In the state shown in FIG. 7B, the burr that arose on the peeled-off portion 4*a* of the segmented end portion 4 is present on the outer side of the joint portion. Therefore, when electrically connecting the peeled-off portions of each pair with each other by welding using TIG welding or the like, melted burr S potentially falls off into the core 2. This may cause deterioration of mechanical characteristics or electrical characteristics of the electrical rotating machine utilizing the coil to be formed.

Next, advantages of the present embodiment from another aspect will be described with reference to FIG. 8A and FIG. 8B. The burrs S are emphasized in FIG. 7A and FIG. 7B, whereas the bends of the peeled-off portions are emphasized in FIG. 8A and FIG. 8B. In the present embodiment, as described above, the peeled-off portion of each of the first segment end portion and the second segment end portion is cut separately while reversing the moving direction of the movable blade. Therefore, as shown in FIG. 8A, the peeled-off portions 3*a* and 4*a* abut against each other due to the bends caused by the pressing force at the time of the cutting.

Therefore, when joining the peeled-off portions 3*a* and 4*a* with each other using a laser, the laser beam Lb is prevented from passing through the gap between the peeled-off portions 3*a* and 4*a* to scratch the insulating layer of the segment end portion 3 or the segment end portion 4.

In the cutting method proposed in PTL1 (Japanese Patent Application Laid-Open Publication No. 2017-99220), when the cutting is performed by nipping from both sides, each peeled-off portion restricts movement of its counterpart, and in addition to that, no bends abutting against each other due to spring back (elastic return) after the cutting arise. Therefore, a gap is prone to occur between the peeled-off portions 3*a* and 4*a* as shown in FIG. 8B, and the laser beam Lb is likely to enter the inside and scratch the insulating layer of the segment end portion 3 or the segment end portion 4. When the insulating layer is damaged, it may cause deterioration of the electrical characteristics of the electrical rotating machine over time.

To address the problem of the damage to the insulating layer caused by laser beam penetration, for example, PTL2 (Japanese Patent Application Laid-Open Publication No. 2017-98161) discloses a configuration of, after obliquely cutting a flat wire to leave its coating on the side surface thereof on the joint side obliquely, bending the peeled-off portions to stretch the joint side surfaces straight so as to prevent a gap allowing penetration of laser light from occurring between the joint side surfaces.

However, since this method involves cutting of the conductor, it leads to a decrease in conductivity, and further a decrease in motor output.

In contrast, in the present embodiment, the pressing force at the time of the cutting gives bends to the peeled-off portions to be joined, to solve the problem of damage on the insulating layer due to the penetration of the laser beam without the cutting of the conductor.

That is, according to the cutting method of the present invention, both of the problem that the melt burr portions fall off into the slots during the welding, and the problem of damage on the insulating layers in the case where a laser is used as joining means can be solved simultaneously without causing deterioration in the electric conductivity.

The pair of segment end portions 3 and 4 are shown in FIG. 7A to FIG. 8B, and the same also applies to the pair of segment end portions 5 and 6, and the pair of segment end portions 7 and 8.

Further, although a configuration for collectively cutting segment end portions of six layers is exemplified in the present embodiment, similar configuration can be applied to the cases adopting eight or more layers by increasing the number of insertion holes of the support member 12 and corresponding through holes in the movable member 14 to thereby increase the numbers of the first movable blades 16, the second movable blades 18, the first fixed blades 20 and the second fixed blades 22. Of course, the above configuration can be similarly applied to the cases of adopting four or less layers.

Since the method described in PTL1 adopts a configuration of cutting segment end portions by nipping them by rotating blades from both sides, one blade bites into a plurality of segment end portions at the same time, and thus a large driving force is required.

This driving force is proportional to the number of segment end portions to be cut. In addition, since the conductor metal is pushed out in one direction due to the nipping by the rotation, there is a concern that burrs protrude outward as described above.

In contrast, in the present embodiment, one movable blade corresponds to one segment end portion, and movement of the movable member 14 is linear. Accordingly, it is possible to cope with collective cutting of multilayers through a low driving force and a simple configuration. Since the present embodiment adopts a method of cutting peeled-off portions of the segment end portions of each pair one by one by alternately pressing one peeled-off potion onto the other, burrs due to metal flow always occur on the inner side of the joint portion.

Next, configuration of a coil segment cutting apparatus having the cutting unit 10 will be concretely described with reference to FIG. 9 to FIG. 14.

As shown in FIG. 9, the coil segment cutting apparatus 30 according to the present embodiment includes: a movable horizontal base 34 having a caster 32; a vertical base 36 extending in the vertical direction from the horizontal base 34; a drive mechanism 38 provided on the horizontal base 34 and configured to move the movable member 14; a work holding mechanism 40 supported by the vertical base 36 on the upper side of the drive mechanism 38; and so on.

The drive mechanism 38 includes: a servomotor 42 which is a drive source fixed to the horizontal base 34; a lifting plate 44 which is moved in the vertical direction by the servomotor 42; a linear motion guide 46 supported on the lifting plate 44; a blade platform 48 fixed on the lifting plate 44; and the like.

The linear motion guide 46 includes: a base 50 fixed to the lifting plate 44; a servomotor 52 which is a drive source supported on the left end side of the base 50 in FIG. 9; a ball screw portion 54 which rotates with the rotation of the servomotor 52 (see FIG. 13); and a nut portion 56 which moves screwed to the ball screw portion 54; and a slider 58 fixed to the nut portion 56.

The movable member 14 is fixed to the slider 58 via non-shown insertion holes or the like. Blocks 60 and 62 are fixed to the blade platform 48, and the support member 12 having the first fixed blades 20 and the second fixed blades 22 (see FIG. 3) is fixed to the blocks 60 and 62 through not-shown screw holes or the like.

Central portion of the elevating plate 44 is connected to a rod 42a (see FIG. 12) of the servomotor 42, and both sides thereof are supported by sliding shafts 64 and 66 which move up and down with the drive of the servomotor 42.

The work holding mechanism 40 includes: a gear mechanism 70 that is rotated by a handle 68 (see FIG. 10); a work holding table 72 connected to the gear mechanism 70; and the like. By turning the handle 68, the workpiece holding table 72 can be rotated around the axis 74 shown in FIG. 9 to make the workpiece 76 face downward.

The cylindrical-shaped workpiece 76 (core) is tightened and fixed to the workpiece holding table 72 by fixing jigs 80 and 82 which penetrate through the interior of the workpiece 76 and fitted together with the work 76 from the top and bottom, respectively. FIG. 9 shows a state in which the workpiece 76 is held by and fixed to the workpiece holding table 72 with the segment end portions 78 facing upward.

The segment end portions 78 collectively represent the segment end portions 3 to 8 shown in FIG. 1. Further, when actually manufacturing a coil, coil segments are inserted into the slots provided radially on the entire circumference of the workpiece 76 to be a core, and the segment end portions protrude from a side opposite to the insertion side of each slot. However, in FIG. 9 to FIG. 13, to make the figures more visible, only the segment end portions at a position to be cut by the coil segment cutting apparatus 30 and a position facing thereto are shown.

Here, FIG. 14 shows a configuration of a control unit of the coil segment cutting apparatus 30.

The control unit has a function of controlling operation of the servomotors 42 and 52, and includes a CPU 91, a nonvolatile memory 92, a RAM 93, an operation unit I/F 94, an operation unit 95, a drive unit I/F 96, a communication I/F 97, and a system bus 98.

The CPU 91 is a processor configured to control operation of the servomotors 42 and 52 according to parameters stored in the non-volatile memory 92 and operations by the operator made in the operation unit 95, by executing programs stored in the non-volatile memory 92 using RAM 93 as a work area.

The parameters stored in the non-volatile memory 92 include the amount of movement of the lifting plate 44, the amount of movement of the movable member 14 for cutting the segment end potions, and the like.

The operation unit 95 is a unit configured to accept operations by an operator, such as a key, a button, a touch panel, or the like. The operation unit I/F 94 is configured to supply signals indicating operations performed on the operation unit 95 to the CPU 91.

The drive unit I/F 96 is an interface for supplying control signals to the servomotors 42 and 52 in accordance with instructions from the CPU 91.

The communication IX 97 is an interface configured to communicate with external apparatuses.

Next, FIG. 10 is a side view seen from the right side of FIG. 9, and FIG. 11 is a plan view.

In FIG. 10, reference numeral 83 indicates an operation lever of an index plunger capable of manually rotating the workpiece 76 fixed to the workpiece holding table 72 by a predetermined amount of indexing.

When the operator of the coil segment cutting apparatus 30 turns the lever 83 downward, the locked state of the workpiece 76 with respect to the workpiece holding table 72 is released, and then the workpiece 76 supported on the workpiece holding table 72 through a not-shown bearing can be manually rotated around the axis 75. When the operator turns the lever 83 upward, the workpiece 76 is locked to the workpiece holding table 72, and it becomes possible to cut the segment end portions.

When cutting the segment end portions, the operator repeats the operations of: rotating the lever 83 downward and rotating the workpiece 76 by a predetermined amount of indexing, upon each completion of the cutting of the segment end portions of one row in the radial direction of the core; and then turning the lever 83 upward and performing the cutting in the locked state.

When cutting the segment end portions, the operator turns the handle 68 to rotate the workpiece holding table 72 so that the segment end 78 faces downward as shown in FIG. 12.

Thereafter, the operator operates the servomotor 42 to raise the lifting plate 44 to a position near a predetermined position, turns the lever 83 downward from the state of FIG. 10 to release the locked state by the index plunger, manually rotates the workpiece holding table 72 by a predetermined amount of indexing, and then turning the lever 83 upward to lock.

Next, the operator raises the lifting plate 44 to the cutting position in a state where a row of segment end portions 78 to be cut are opposed to the insertion holes 12A, 12B and 12C of the cutting unit 10 shown in FIG. 1. Thus, the segment end portions 3, 4, 5, 6, 7, and 8 are inserted into the insertion holes 12A, 12B, and 12C of the support member 12 as shown in FIG. 4A, and their peeled-off portions 3a, 4a, 5a, 6a, 7a, and 8a enters the through holes 14A, 14B, and 14C of the movable member 14.

Thereafter, the servomotor 52 operates to move the movable member 14 to the right in FIG. 12 by a predetermined amount as described above, thereby the peeled-off portions 3a, 5a, and 7a of the segment end portions 3, 5, and 7 are cut. Thereafter, the servo motor 52 operates to move the movable member 14 to the left by a predetermined amount, thereby the peeled-off portions 4a, 6a, and 8a of the segment end portions 4, 6, and 8 are cut.

These steps and details of the support member 12 and the movable member 14 are as described with reference to FIG. 1 to FIG. 6B. The amount of movement of the movable member 14 is preferably determined and preset in the non-volatile memory 92 in consideration of the thickness of the peeled-off portions to be cut, the shape and size of the insertion holes 12A to 12C and the through holes 14A to 14C.

The operator then lowers (retracts) the lifting plate 44 by a predetermined amount to pull out the segment end portions 3 to 8 from the insertion holes 12A to 12C, then operates the lever 83 to unlock the workpiece 76, and rotate the workpiece 76 by a predetermined amount index in the circumferential direction. Thereafter, the operator locks the workpiece 76 again, raise the lifting plate 44, and moves the movable member 14 to cut the peeled-off portions of the segment end portions to be cut next. By repeating these operation, distal ends of the peeled-off portions are cut in all the segment end portions.

After the cutting of the peeled-off portions of all the segment end portions is completed, the operator moves the lifting plate 44 to the home position (lowermost position) by operating the servomotor 42 and rotates the workpiece holding table 72 to face upward through operation of the handle 68. In this state, the workpiece 76 can be replaced with another one to be processed next.

FIG. 13 is a schematic plan view corresponding to FIG. 11, showing a state with the work holding mechanism 40 removed so that the drive mechanism 38 can be seen.

As shown in FIG. 13, a groove 58a for housing the movable member 14 is formed on the slider 58 along the axial direction of the ball screw portion 54, and the movable member 14 is fixed by a screw member or the like after being housed in the groove 58a.

Incidentally, the example of manually rotating the workpiece 76 is explained here, but of course the rotation may be performed by automatic control. Including other steps, cutting of the segment end portions performed by the coil segment cutting apparatus 30 can be automatically performed through control of operations of the servomotors, the lock mechanism, and the like by a control unit employing a computer or a control circuit. Portions to be manually operated and not having drive units in FIG. 9 to FIG. 13 may be modified to replace the operation units such as a lever with drive mechanisms such as a motor as appropriate to adopt automatic operations.

Next, an electrical rotating machine manufacturing system 100 incorporating the above coil segment cutting apparatus 30 will be explained with reference to FIG. 15.

The electrical rotating machine manufacturing system 100 includes: a wire feeder 101 where a bobbin in which a rectangular wire as a wire is wound is arranged; a straightening unit 102 configured to convey the wire and correct distortion on the flatwise surfaces and edgewise surfaces thereof by a plurality of roller pairs during the conveyance; a coat peeling unit 103 configured to peel off an insulative coating layer coating the wire by a laser beam, a cutting blade, or the like, at regions corresponding to both end portions of wire rods having a predetermined length; a cutting unit 104 configured to cut the wire in the peeled regions into the predetermined length; a primary bending unit 105 configured to bend the cut straight wire rod into a predetermined shape (for example, U-shape) in one plane (for example, a horizontal plane); a secondary bending unit 106 configured to bend the wire rod which have been bent in the primary bending portion 105 (primarily bent body) in a plane perpendicular to the above one plane (for example, a vertical plane), to form a shape (crank shape) for varying positions of the slot insertion portions in the radial direction of a core, in the central portion of the wire rod; a coil assembly unit 107 configured to assemble the coil segments formed by the bending in the secondary bending portion 106 into an annular shape; a coil twisting unit 108 configured to twist the segment end portions protruding from an end face of the core when inserting the assembled coil segments into the core; the coil segment cutting apparatus 30 described above configured to cut the segment end portions after the twisting to align them; and a welding unit 109 configured to weld portions of the segment end portions to be joined after the cutting, to form a coil.

Preferred embodiments of the present invention are described above. However, the present invention is not limited to such specific embodiments, and various modifications and variations are conceivable. The above-described configuration of the present invention can be implemented by extracting only a part thereof, and the variations described in the above explanation can be applied in any combination as long as they do not conflict with each other. The effects described in the embodiments of the present invention are merely illustrative of the most preferred effects resulting from the present invention, and the effects according to the present invention are not limited to those described in the embodiments of the present invention.

REFERENCE SIGNS LIST

2 Core
3, 4, 5, 6, 7, and 8 Segment end portions
3a, 4a, 5a, 6a, 7a, and 8a Peeled-off portions (portions to be joined)
12 Support member
12A, 12B, and 12C Insertion holes
14 Movable member
14A, 14B, and 14C Through holes
16 First movable blade
18 Second movable blade
20 First fixed blade
22 Second fixed blade
40 Workpiece holding mechanism

The invention claimed is:

1. A coil segment cutting method of cutting first and second segment end portions of coil segments to be joined with each other for aligning positions of apexes of the first and second segment end portions to be joined, the coil segments being inserted into slots of a core of a stator or a rotor to form a plurality of layers in a radial direction of the core, the first and second segment end portions being portions protruding from an end face of the core, comprising:
cutting the first segment end portion to form the apex of the first segment end portion with a first movable blade that moves in a first direction such that the first movable blade pushes the first segment end portion onto the second segment end portion, in a state where the first and second segment end portions are stacked with each other and supported; and
after cutting the first segment end portion with the first movable blade, cutting the second segment end portion to form the apex of the second segment end portion with a second movable blade that moves in a second direction opposite the first direction such that the second movable blade pushes the second segment end portion onto the apex of the first segment.

2. The coil segment cutting method according to claim 1, wherein when cutting the first segment end portion with the first movable blade, the second segment end portion is received and supported by a first fixed blade, and when cutting the second segment end portion with the second movable blade, the apex of the first segment is received and supported by a second fixed blade.

3. The coil segment cutting method according to claim 2, wherein the first movable blade and the second movable blade are provided on a same movable member, and wherein after cutting the first segment end portion by moving the movable member in the first direction, the second segment end portion is cut by moving the movable member in the second direction, opposite to the first direction.

4. The coil segment cutting method according to claim 1, wherein the first and second segment end portions are cut in a state where the core is supported such that the first and second segment end portions face downward.

5. A coil segment cutting apparatus configured to cut first and second segment end portions of coil segments to be joined with each other for aligning positions of apexes of the first and second segment end portions to be joined, the coil segments being inserted into slots of a core of a stator or a rotor to form a plurality of layers in a radial direction of the core, the first and second segment end portions being portions protruding from an end face of the core, comprising:
a first movable blade configured to push the first segment end portion onto the second segment end portion in a first state where the first and second segment end portions are stacked with each other;

a second movable blade configured to push the second segment end portion onto the apex of the first segment [end portion] in a second state where the first and second segments [end portions] are stacked with each other;

a drive source including a servomotor configured to drive the first movable blade and the second movable blade; and control unit configured to control the drive source to move the first movable blade in a first direction and by a first predetermined amount thereby cutting the first segment end portion with the first movable blade and to move the second movable blade in a second direction opposite the first direction and by a second predetermined amount thereby cutting the second segment end portion with the second movable blade, after cutting the first segment end portion with the first movable blade.

6. The coil segment cutting apparatus according to claim 5, comprising:

a first fixed blade configured to receive and support the second segment end portion when cutting the first segment end portion with the first movable blade; and a second fixed blade configured to receive and support the apex of the first segment [end portion] when cutting the second segment end portion with the second movable blade.

7. The coil segment cutting apparatus according to claim 6, wherein the first movable blade and the second movable blade are provided on a same movable member.

8. The coil segment cutting apparatus according to claim 7, further comprising a support member including a plurality of insertion holes for inserting the first and second segment end portions therein, the insertion holes being aligned along a direction of movement of the movable member, wherein each of the insertion holes comprises the first fixed blade and the second fixed blade, wherein the movable member comprises a plurality of through holes configured to respectively connect with the plurality of insertion holes when the movable member is at a predetermined position, and wherein each of the through holes comprises the first movable blade and the second movable blade.

9. The coil segment cutting apparatus according to claim 5, further comprising;

a work-piece holder configured to hold the core; and a rotator configured to rotate the core held by the work-piece holder to make the first and second segment end portions face downward.

* * * * *